United States Patent
Nakazawa

(10) Patent No.: US 10,101,468 B2
(45) Date of Patent: Oct. 16, 2018

(54) DATA COLLECTING DEVICE FOR EMISSION TOMOGRAPHY DEVICE, EMISSION TOMOGRAPHY DEVICE EQUIPPED THEREWITH, AND DATA COLLECTING METHOD FOR EMISSION TOMOGRAPHY

(71) Applicant: SHIMADZU CORPORATION, Kyoto (JP)

(72) Inventor: Masayuki Nakazawa, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 364 days.

(21) Appl. No.: 13/839,779

(22) Filed: Mar. 15, 2013

(65) Prior Publication Data

US 2013/0299704 A1 Nov. 14, 2013

(30) Foreign Application Priority Data

Mar. 22, 2012 (JP) .................. 2012-065426

(51) Int. Cl.
G01T 1/164 (2006.01)
G01T 1/29 (2006.01)

(52) U.S. Cl.
CPC ............ *G01T 1/164* (2013.01); *G01T 1/2985* (2013.01)

(58) Field of Classification Search
CPC .... G01T 1/2978; G01T 1/2992; G01T 1/2985
See application file for complete search history.

(56) References Cited

U.S. PATENT DOCUMENTS

| | | | | |
|---|---|---|---|---|
| 5,512,755 A * | 4/1996 | Vickers | .................... | G01T 1/208 250/207 |
| 5,841,140 A * | 11/1998 | Mc Croskey | ......... | G01T 1/1642 250/363.03 |
| 7,274,021 B2 * | 9/2007 | Yanagita | .................. | G01T 1/172 250/363.03 |
| 2003/0062482 A1 * | 4/2003 | Williams et al. | ........ | 250/363.03 |

FOREIGN PATENT DOCUMENTS

| JP | 61-271486 A | 12/1986 |
|---|---|---|
| JP | 6-342074 A | 12/1994 |
| JP | 2011-080979 A | 4/2011 |
| JP | 2011-232044 A | 11/2011 |

OTHER PUBLICATIONS

Notice of Reasons for Refusal Japanese Patent Application No. 2012-065426 dated Jan. 6, 2015 with full English translation.

* cited by examiner

*Primary Examiner* — Christine S Kim
(74) *Attorney, Agent, or Firm* — McDermott, Will & Emery LLP

(57) ABSTRACT

An emission tomography device includes emission detectors for detecting a gamma ray incident from a patient body as a pulse signal, and a data collecting device for collecting information in which the gamma ray is detected in an emission detector. The data collecting device includes a timing circuit for outputting timing information corresponding to the timing of occurrence of an event in which a gamma ray is detected as a pulse signal in an emission detector, a simultaneous count circuit for identifying timing information in a true simultaneous count by comparing a plurality of timing information sent from a plurality of timing circuits, and a pulse calculating portion calculating a gamma ray detection location and a gamma ray energy from an intensity value of a pulse signal corresponding to the timing information identified by the simultaneous count circuit as a true simultaneous count.

13 Claims, 7 Drawing Sheets

[FIG. 2]
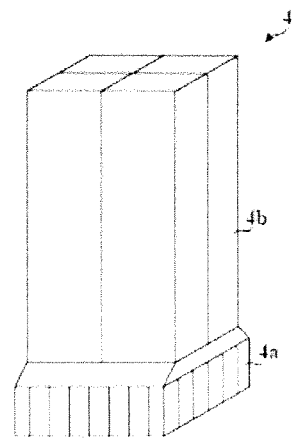
[FIG. 3]
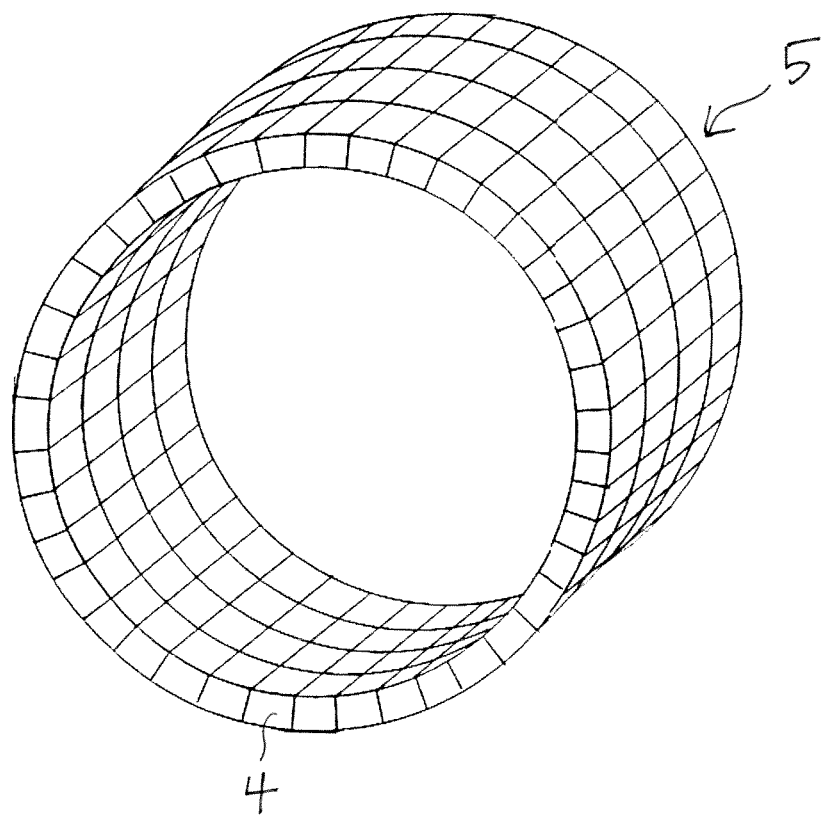

[FIG. 4]
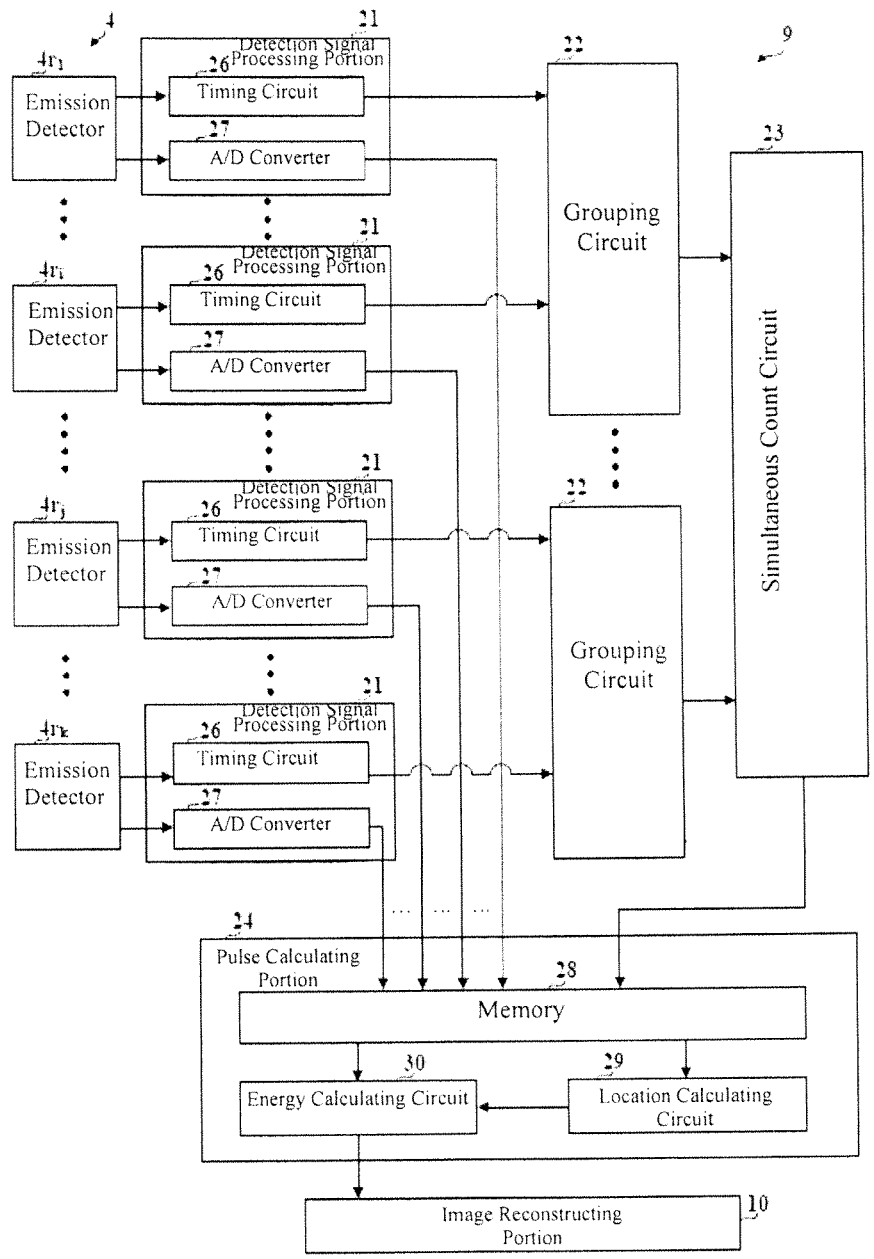

[FIG. 5]

| Detector | 100 nsec | 90 nsec | 80 nsec | 70 nsec | 60 nsec | 50 nsec | 40 nsec | 30 nsec | 20 nsec | 10 nsec |
|---|---|---|---|---|---|---|---|---|---|---|
| $4r_1$ | 0 | Da2 | 0 | 0 | 0 | 0 | 0 | 0 | 0 | 0 |
| ⋮ | | | | | ⋮ | | | | | |
| $4r_i$ | 0 | 0 | Da4 | 0 | 0 | Da6 | 0 | 0 | 0 | Da7 |
| ⋮ | | | | | ⋮ | | | | | |
| $4r_j$ | 0 | Da3 | 0 | 0 | 0 | 0 | 0 | 0 | 0 | 0 |
| ⋮ | | | | | ⋮ | | | | | |
| $4r_k$ | Da1 | 0 | 0 | Da5 | 0 | 0 | 0 | 0 | 0 | Da8 |
| ⋮ | | | | | | | | | | |

[FIG. 6]

| Detector | 100 nsec | 90 nsec | 80 nsec | 70 nsec | 60 nsec | 50 nsec | 40 nsec | 30 nsec | 20 nsec | 10 nsec |
|---|---|---|---|---|---|---|---|---|---|---|
| $4r_1$ | Da2 | 0 | 0 | 0 | 0 | 0 | 0 | 0 | 0 | 0 |
| ⋮ | | | | | ⋮ | | | | | |
| $4r_i$ | 0 | Da4 | 0 | 0 | Da6 | 0 | 0 | 0 | Da7 | 0 |
| ⋮ | | | | | ⋮ | | | | | |
| $4r_j$ | Da3 | 0 | 0 | 0 | 0 | 0 | 0 | 0 | 0 | 0 |
| ⋮ | | | | | ⋮ | | | | | |
| $4r_k$ | 0 | 0 | Da5 | 0 | 0 | 0 | 0 | 0 | Da8 | 0 |
| ⋮ | | | | | | | | | | |

DATA COLLECTING DEVICE FOR EMISSION TOMOGRAPHY DEVICE, EMISSION TOMOGRAPHY DEVICE EQUIPPED THEREWITH, AND DATA COLLECTING METHOD FOR EMISSION TOMOGRAPHY

CROSS-REFERENCE TO RELATED APPLICATION

The present application claims priority from Japanese patent applications No. 2012-065426 filed on Mar. 22, 2012, the entire contents of which are hereby incorporated by reference.

TECHNICAL FIELD

The present disclosure relates to a data collecting device for an emission tomography device, and an emission tomography device equipped therewith, along with a data collecting method for emission tomography, for seeking nuclear medicine data for a patient body based on emissions produced from the patient body that has been injected with a radiopharmaceutical, and, in particular, relates to a technology for calculating a location and for calculating and energy when detecting radiation as a pulse signal.

BACKGROUND

One type of emission tomography device is an ECT (Emission Computed Tomography) device, which will be explained using a PET (Positron Emission Tomography) device as a particular example. In a PET device, the two gamma rays that are produced through the annihilation of a positron are detected by a plurality of detectors. Specifically, a radiopharmaceutical that includes a positron-emitting isotope is injected into the patient body, and the pair of annihilation gamma rays that are emitted from the patient body that has been injected are detected by a large number of emission detectors. Given this, if gamma rays are detected within a given period of time by two emission detectors this is considered to be simultaneous detection, and is counted as a pair of pair annihilation gamma rays. The location at which the pair annihilation occurred is specified as being on a straight line connecting the locations of the two emission detectors that detected the radiation. In this way, simultaneous count information is accumulated and a reconstructing process is performed to produce an image of the positron-emitting isotope distribution, that is, to produce a tomographic image.

An emission detector that is used in a PET device is a combination of a scintillator block, which has a plurality of scintillators, and a photon multiplier tube (PMT). Many emission detectors are arranged in the form of a ring to structure a detector ring. Data collection is conducted by performing simultaneous counting of pair annihilation gamma rays by the emission detectors arranged in this way. In order to evaluate efficiently the simultaneous counts of events detected by the individual emission detectors, the individual emission detectors are divided into a number of groups, such as disclosed in Japanese Unexamined Patent Application Publication H6-342074. The identification of simultaneous counts between individual groups is performed by compiling event information for the individual emission detectors within each group, with each group, which has a plurality of emission detectors, functioning as a single emission detector. Furthermore, as disclosed in Japanese Unexamined Patent Application Publication 2011-232044, there is also a Time of Flight (TOF)-type PET device able to specify the location at which the annihilation emission pair was produced using the time difference in the annihilation emission pair in a PET device.

The evaluation of the simultaneous count between groups will be explained in reference to FIG. 9. Respective detector signal processing circuits 72 are connected to the emission detectors 71 that detect incident gamma rays as pulse signals. A detector signal processing circuit 72 has a location calculating circuit 73, an energy calculating circuit 74, and a timing circuit 75 for detecting the respective location information for incident gamma rays, energy information for incident gamma rays, and detection timing information, based on pulse signals inputted from the emission detectors 71.

In an emission detector 71, the location information, energy information, and timing information for an event wherein a gamma ray is detected as a pulse signal are sent, as single event information, from the detector signal processing circuit 72 to the grouping circuit 76. The grouping circuit 76 sequentially outputs, to a simultaneous count circuit 77, the event information that is sent from the plurality of detector signal processing circuit 72. The simultaneous count circuit 77 uses the timing information that is included in the event information to perform identification of simultaneous counts between grouping circuits 76. In this way, the event information is sent from the detector signal processing circuits 72 through the grouping circuits 76 to the simultaneous count circuit 77.

SUMMARY

One aspect according to the present disclosure is a data collecting device for an emission tomography device comprising: a timing circuit for outputting timing information corresponding to the time of occurrence of an event wherein a gamma ray is detected as a pulse signal in an emission detector; a simultaneous count circuit for identifying timing information in a true simultaneous count by comparing a plurality of timing information sent from a plurality of timing circuits; and a pulse calculating portion for calculating a detection location of a plurality of gamma rays, and energies of the gamma rays, from intensity values of the pulse signals corresponding to the timing information identified as true simultaneous counts by the simultaneous count circuit.

Given the structure set forth above, the timing circuit detects and outputs timing information corresponding to the time of occurrence of an event wherein a gamma ray is detected as a pulse signal in an emission detector. The simultaneous count circuit compares the plurality of timing information sent from the plurality of timing circuits to identify timing information of true simultaneous counts. The pulse calculating portion calculates the gamma ray detection locations and gamma ray energies from the intensity values of the pulse signals corresponding to the timing information identified by the simultaneous count circuit as true simultaneous counts. Calculating the gamma ray detection locations and gamma ray energies from the intensity values of the pulse signals corresponding to the timing information identified as true simultaneous counts makes it possible to reduce the amount of calculation substantially when compared to calculating the gamma ray detection locations and gamma ray energies from the intensity values of all of the pulse signals.

Moreover, the pulse calculating portion comprises: a memory portion for storing an intensity value of a pulse signal; a location calculating circuit for calculating a detection location of a gamma ray based on the intensity value of the pulse signal; and an energy calculating circuit for calculating an energy of a gamma ray, detected based on the intensity value of the pulse signal, wherein: the intensity value of the pulse signal corresponding to the timing information identified as a true simultaneous count in the simultaneous count circuit is outputted from the memory portion to the location calculating circuit and the energy calculating circuit.

In some embodiments, the pulse calculating portion is provided with a memory portion, a location calculating circuit, and an energy calculating circuit. The memory portion stores the intensity values of the pulse signals, enabling identification of simultaneous counts in the interval over which the intensity values of the pulse signals are stored. The location calculating circuit calculates the gamma ray detection locations based on the intensity values of the inputted pulse signals, and the energy calculating circuit calculates the energies of the detected gamma rays based on the intensity values of the inputted pulse signals. The memory portion outputs, to the location calculating circuit and the energy calculating circuit, the intensity values for the pulse signals corresponding to the timing information identified as true simultaneous counts by the simultaneous count circuit, enabling the location calculating circuit and energy calculating circuit to perform their respective calculations for only those intensity values of pulse signals of events identified as true simultaneous counts, based on the simultaneous count identification result.

Moreover, the memory portion erases intensity values of pulse signals corresponding to events not identified as true simultaneous counts. Doing so makes it possible to reduce the amount of data stored in the memory portion.

The simultaneous count circuit may detect timing difference information for events identified as true simultaneous counts; and the location calculating circuit may calculate the gamma ray emission location based on the time difference information inputted from the simultaneous count circuit. The simultaneous count circuit detects time difference information based on the timing information for events identified as true simultaneous counts. This time difference information is outputted from the simultaneous count circuit to the location calculating circuit. The location calculating circuit is able to calculate and specify the location at which the gamma ray was produced, based on this time difference information.

A second aspect in the present disclosure is an emission tomography device comprising: an emission detector for detecting, as a pulse signal, a gamma ray incident from a patient body; and a data collecting device for collecting information wherein the gamma ray is detected in the emission detector, wherein: the data collecting device comprises: a timing circuit for outputting timing information corresponding to the time of occurrence of an event wherein a gamma ray is detected as a pulse signal in an emission detector; a simultaneous count circuit for identifying timing information in a true simultaneous count by comparing a plurality of timing information sent from a plurality of timing circuits; and a pulse calculating portion for calculating a detection location of a gamma rays, and energies of the gamma rays, from intensity values of the pulse signals corresponding to the timing information identified as true simultaneous counts by the simultaneous count circuit.

The emission tomography device structured as set forth above, calculating the gamma ray detection locations and gamma ray energies from the intensity values of the pulse signals corresponding to the timing information identified as true simultaneous counts makes it possible to reduce the amount of calculation substantially when compared to calculating the gamma ray detection locations and gamma ray energies from the intensity values of all of the pulse signals.

A third aspect in the present disclosure is a data collecting method for an emission tomography device including: a timing information detecting step for detecting timing information corresponding to the timing of occurrence of an event wherein a gamma ray is detected as a pulse signal in an emission detector; a simultaneous count identifying step for identifying timing information in a true simultaneous count by comparing a plurality of timing information; and a pulse calculating step for calculating the gamma ray detection location and gamma ray energy based on the pulse signal intensity information corresponding to the timing information in an identified true simultaneous count.

In the timing information detecting step, timing information corresponding to the times of occurrences of events wherein gamma rays are detected as pulse signals in the emission detectors are detected. In the simultaneous count identifying step, a plurality of timing information is compared to identify timing information of true simultaneous counts. In the pulse calculating step, gamma ray detection locations and gamma ray energies are calculated from the intensity values of the pulse signals corresponding to the timing information identified as true simultaneous counts, thus enabling a substantial decrease in the amount of calculation when compared to calculating the gamma ray detection locations and gamma ray energies from intensity values for all of the pulse signals.

The data collecting device for an emission tomography device, the emission tomography device equipped therewith, and the data collecting method for emission tomography according to the present disclosure enable a reduction in the demand of calculation involved in the location calculations and energy calculations.

BRIEF DESCRIPTIONS OF THE DRAWINGS

Examples of the subject matter claimed herein are illustrated in the figures of the accompanying drawings and in which reference numerals refer to similar elements and in which:

FIG. 2 is a schematic perspective drawing of an emission detector according to an embodiment of the present disclosure.

FIG. 3 is a schematic plan view of a detector ring according to an embodiment of the present disclosure.

FIG. 4 is a block diagram illustrating the structure of a data collecting device according to an embodiment of the present disclosure.

FIG. 5 is an explanatory diagram illustrating the structure of a memory according to an embodiment of the present disclosure.

FIG. 6 is an explanatory diagram illustrating the structure of a memory according to an embodiment of the present disclosure.

DETAILED DESCRIPTION

1. PET Device

Figure 1:
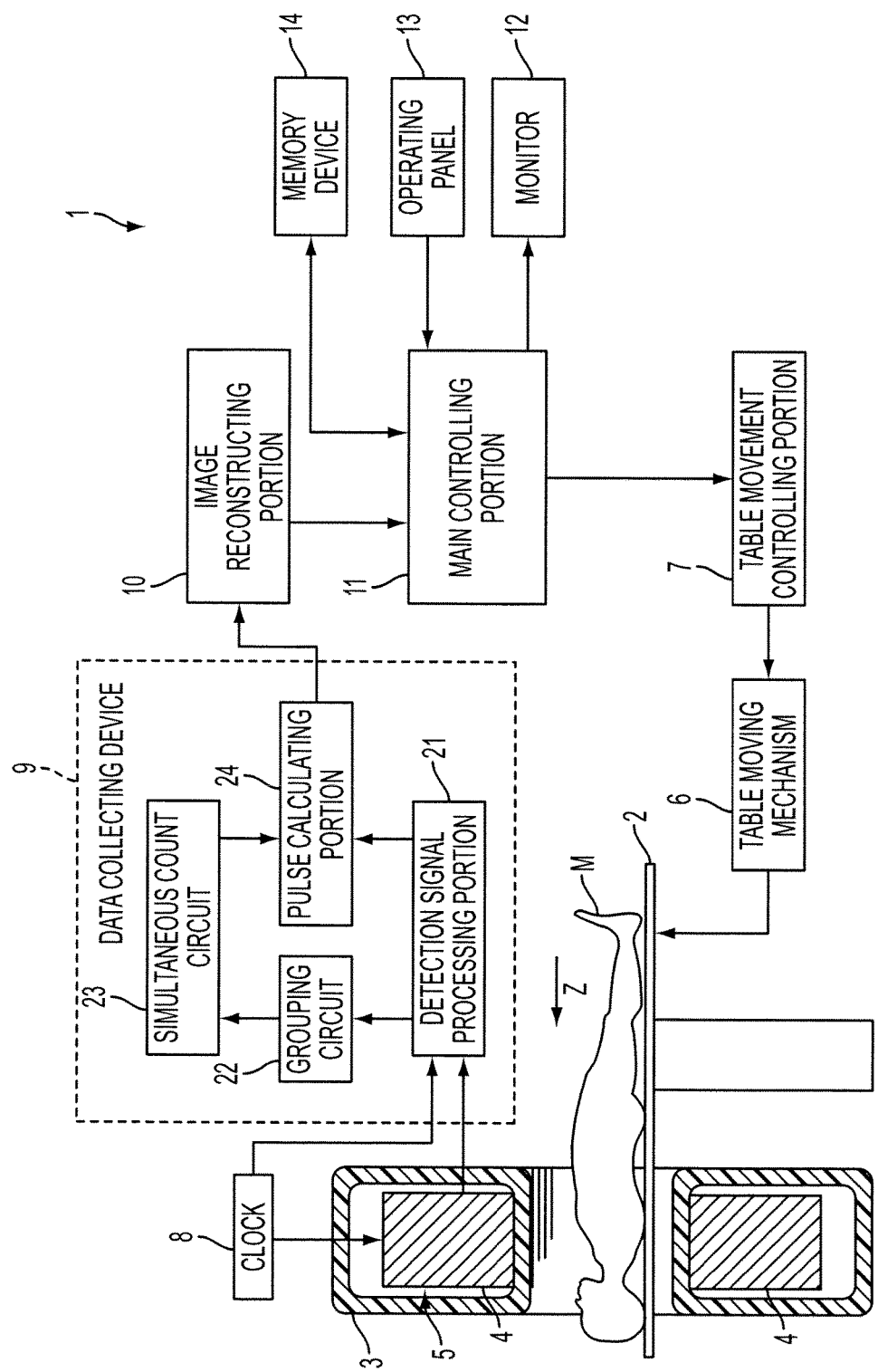
FIG. 1 is a block diagram of a PET device according to an embodiment of the present disclosure.

An embodiment of the present disclosure will be explained below in reference to the drawings. FIG. 1 is a block diagram illustrating a structure of a PET device according to an embodiment, FIG. 2 is a schematic perspective drawing of an emission detector according to an embodiment, and FIG. 3 is a schematic plan view of a detector ring according to an embodiment. Note that the explanation in this embodiment will use a gamma ray as an example of an emission in the present disclosure.

In the conventional PET devices and TOF-type PET devices, the respective gamma ray location calculations and energy calculations are performed for all events that are detected, and the timing information, location information, and energy information is sent to the simultaneous count circuit as individual event information. However, the proportion of detected events that are identified as simultaneous counts is about 13%, and thus more than 80% of the event information is data that is discarded rather than being used in image reconstruction. An embodiment discussed below is provided to reduce the amount of calculation involved in the location calculations and energy calculations is reduced.

A PET device 1 in the embodiment s provided with a table 2 on which the patient body M is placed, a gantry 3 having an opening portion into which the table 2 is introduced, emission detectors 4 for detecting gamma rays emitted from the patient body M, and a detector ring 5 wherein the emission detectors 4 are disposed in the shape of a ring within the gantry 3.

An opening that is provided in the detector ring 5 is of a circular shape that extends in the direction of length of the table 2, that is, in the z direction, which is the direction of the bodily axis of the patient body M. Moreover, the PET device 1 is provided with a table moving mechanism 6 for driving the table 2, a table movement controlling portion 7 for controlling the amount of movement of the table 2, a clock 8 that sends time mark information, comprising serial numbers, to each of the emission detectors 4, a data collecting device 9 for collecting event information detected by the individual emission detectors 4, and an image reconstructing portion 10 for reconstructing a tomographic image based on the event information that has been collected.

The table 2 is provided so as to pass through the gantry 3 and an opening of the detector ring 5 in the z direction, and can reciprocate along the z direction. Such reciprocating motion of the table 2 is achieved by the table moving mechanism 6. In the table moving mechanism 6, the amount of motion of the table 2 is controlled by the table movement controlling portion 7. The entirety of the table 2 is inserted into the interior of the detecting ring 5 through an opening in one direction from a standby location that is located on the outside of the detecting ring 5.

As shown in FIG. 2, an emission detector 4 is provided with a scintillator block 4a that converts, into light, the gamma radiation produced from the patient body M, and a photoelectron multiplier tube 4b that performs photoelectric conversion on the light. The photoelectric conversion converts the light into an electric pulse signal. The scintillator block 4a has a plurality of individual scintillators. The detection of a pulse signal by the photoelectron multiplier tube 4b is termed an "event." In this plurality of individual scintillators, a plurality of emission pulse signals is detected. The energies possessed by these pulses are detected in specific ratios depending on the locations of incidence of the gamma rays.

In some embodiments, about 100 emission detectors 4 are arrayed radially on an imaginary circle on a plane that is orthogonal to the z direction to form one unit detector ring. (See FIG. 3.) Detector rings may be arranged adjacent to each other along the z axis to form a tube shape detector ring 5.

The PET device 1 is further provided with a main controlling portion 11 for the overall control of the individual portions, a monitor 12 for displaying the reconstructed tomographic image, an operating panel 13 by which an operator inputs a variety of settings, and a memory device 14 for storing the tomographic images and various data. The main controlling portion 11 may include a CPU (a central processing device), or the like. The data collecting device 9 and image reconstructing portion 10 may include a microprocessor or a Field Programmable Data Array (FPDA), or may be include a portion of the CPU of the main controlling portion 11. Moreover, the operating panel 13 may include a pointing device which is typically a mouse, a keyboard, a joystick, a trackball, a touch panel, or the like. The operator is able to provide an instruction from the operating panel 13 to start the imaging. The monitor 12 may be a liquid crystal display device or a Cathode Ray Tube (CRT) display, and the memory device 14 may be a memory medium such as a hard disk, a memory, a storage device, or the like.

2. Data Collecting Device

The data collecting device will be explained next in reference to FIG. 4. FIG. 4 is a block diagram illustrating a structure of a data collecting device. In FIG. 4, an emission detector $4r_l$, an emission detector $4r_i$, an emission detector $4r_j$ and an emission detector $4r_k$, respectively, are divided into identical groups, where a group that includes the emission detector $4r_l$ and the emission detector $4r_i$, and the group that includes the emission detector $4r_j$ and the emission detector $4r_k$, are disposed facing each other.

The data collecting device 9 collects, from the pulse signals detected by the emission detectors 4, timing information and the pulse intensities for the light that s detected, and counts the information for the true events that are pairs. The data collecting device 9 is provided with detector signal processing portions 21 that are connected to the individual emission detectors 4. The data collecting device 9 may also include grouping circuits 22 that compile and output, as a single group, the timing information that is outputted from the plurality of detector signal processing portions 21. The data collecting device 9 may further include a simultaneous count circuit 23 for counting information of true events wherein pairs of individual timing information are identified within the grouping circuits 22, and a pulse calculating portion 24 for calculating the incidence locations and energies of gamma rays from the intensities of the pulse signals of events identified as true simultaneous counts.

A detector signal processing portion 21 is provided for each emission detector 4, and has a timing circuit 26 for detecting the timing with which light is detected by the emission detector 4, and an A/D converter 27 for converting the detected pulse signal from an analog signal into a digital signal. The detector signal processing portion 21 performs the signal processing for a detection interval that is established in advance, namely, for each individual frame, based on the clock signal that is inputted from the clock 8. In some embodiments, one frame is 10 ns, matching the conversion period of the A/D converter 27, but there is no constraint to being set to this value.

The timing circuit 26 can detect the time mark of the rising edge of a pulse signal wherein light is detected by the photoelectron multiplier tube 4b. In this way, timing information corresponding to the timing of the occurrence of an event wherein a gamma ray is detected as a pulse signal in an emission detector 4 is outputted to the grouping circuit 22 from the timing circuit 26.

The A/D converter 27 converts the intensity value of the pulse signal detected by the photoelectron multiplier tube 4b (hereinafter termed the "pulse intensity value") from an analog signal to a digital signal. The pulse intensity value of the converted digital signal is outputted to a memory 28 of the pulse calculating portion 24, and stored in a region assigned to the individual emission detector 4. The plurality of pulse intensity signals detected by the plurality of scintillators of each of the individual emission detectors 4 are respectively compiled and stored in the designated regions of the memory 28.

The grouping circuit 22 may include an OR circuit that produces a logical sum. The emission detectors 4 and detector signal processing circuits 22 are divided into a plurality of groups, where a grouping circuit 22 that is provided for each individual group compiles each of the individual timing information that is inputted from the plurality of detector signal processing portions 21 that are assigned to that group into single information, and outputs the information to the simultaneous count circuit 23. The simultaneous count circuit 23 compares the timing information sent from each of the grouping circuits 22 to identify for each whether or not there is timing information that forms a pair, to detect timing information of events that are true simultaneous counts. That is, the timing information that is outputted from the grouping circuits 22 of the groups that are disposed facing each other is retrieved and the timing information is compared to each other to identify whether or not there are simultaneous counts. When timing information of events that are true simultaneous counts is detected, an instruction is issued so as to output the intensity information for the pulses, in the memory 28 of the pulse calculating portion 24, corresponding to the events that have been identified as true simultaneous counts.

The pulse calculating portion 24 has a memory 28, a location calculating circuit 29, and an energy calculating circuit. The memory 28 may be used for storing pulse intensity values outputted from the individual detection signal processing portions 21. The location calculating circuit 29 may be used for calculating the incidence locations of the gamma rays of an event identified as a simultaneous count. The energy calculating circuit 30 may be used for calculating the energies of the gamma rays of an event identified as a simultaneous count.

The memory 28 stores the pulse intensity values outputted from the A/D converter 27 of each individual detection signal processing portion 21. The pulse intensity values stored in the memory 28 will be explained in reference to FIG. 5 and FIG. 6. FIG. 5 and FIG. 6 are schematic diagrams of data storage in the memory 28. The memory 28 stores a pulse intensity value for at least an amount of time equal to the identification period for simultaneous count in the simultaneous count circuit 23. Normally, the converting period in the A/D converter 27 is shorter than the identifying period for a simultaneous count in the simultaneous count circuit 23, so a plurality of pulse intensity values detected by each of the individual emission detectors 4 is stored in the memory 28. For example, if the converting period of an A/D converter 27 is 10 ns and the simultaneous count identifying period in the simultaneous count circuit 23 is 100 ns, the memory 28 will store data for at least 10 pulse intensity values detected by each individual emission detector 4.

The memory 28 is prepared in advance with areas able to store the data for the respective pulse intensity values for each of the individual emission detectors 4. In FIG. 5 and FIG. 6, storage areas for the individual emission detectors 4 are provided in each individual row. Moreover, each column contains pulse intensity values inputted with each individual conversion period for the A/D converters 27, stored in accordance with the passage of time. The column furthest to the right contains the pulse intensity values detected in the most recent conversion period. The pulse intensity values in the respective columns are shifted one column to the left with each conversion period of the A/D converters 27. Each time new pulse intensity values are inputted from the A/D converters 27, the pulse intensity values of the column that is furthest to the left is automatically overwritten and erased.

In FIG. 5, the pulse intensity values Da 7 and Da 8 of the emission detectors $4r_j$ and $4r_k$, for example, are inputted from the respective detection signal processing circuits 21 and stored. Note that the schematic diagram of data storage in the memory 28, illustrated in FIG. 6, is in a state wherein 10 ns have elapsed since the state in FIG. 5, where new pulse intensity value data have been inputted from each of the individual detection signal processing circuits 21 and stored. Each of the pulse intensity data values of the state in FIG. 5 have been shifted by one column to the left to produce the state of storage illustrated in FIG. 6. The data Da 1 in FIG. 5 has, in FIG. 6, in erased by being overwritten with a 0 value. Note that the data Da 1 through Da 8 are each data including a plurality of pulse intensity values detected by the plurality of scintillators in each of the emission detectors 4.

When an instruction for outputting a pulse intensity value corresponding to timing information that has been identified as an event of a true simultaneous count has been inputted from the simultaneous count circuit 23, the memory 28 outputs the corresponding pulse intensity values to the location calculating circuit 29 and the energy calculating circuit 30. The memory 28 corresponds to the memory portion in the present disclosure.

The location calculating circuit 29 performs a calculation process using a center-of-mass calculating technique based on the pulse intensity value data to calculate which part of the emission detector 4 it was into which the gamma rate was incident. The calculated location information is outputted to the energy calculating circuit 30. Moreover, the energy calculating circuit 30 totals the pulse intensity values detected by the individual emission detectors 4 to calculate the energy of the gamma rays incident into the emission detectors 4. The calculated energy information is outputted together with the location information to the image reconstructing portion 10. The calculations in the location calculating circuit 29 and the energy calculating circuit 30 must be completed within several hundred nanoseconds at the longest, and thus require high-speed processing.

3. Data Collection for Emission Tomography

Figure 7:
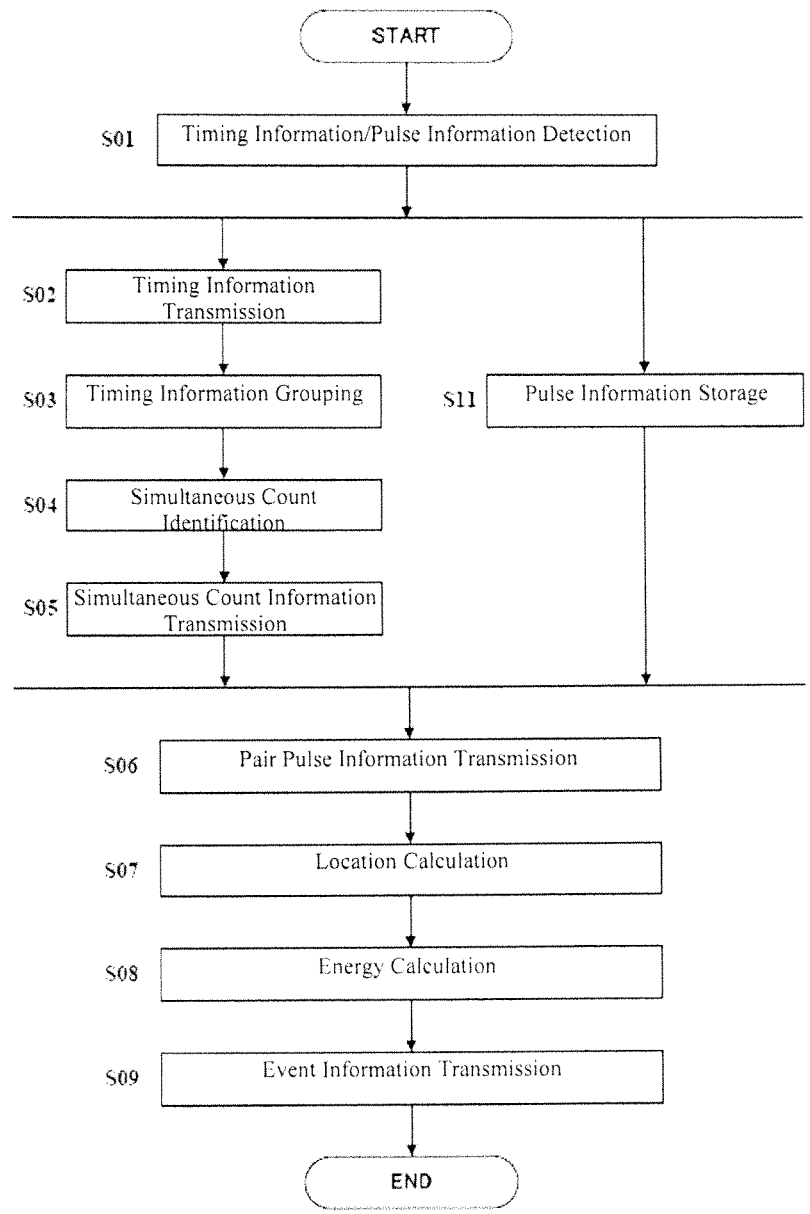
FIG. 7 is a flowchart illustrating the flow of data collection according to an embodiment of the present disclosure.

FIG. 7 will be referenced next in explaining a method for collecting data for emission tomography. FIG. 7 is a flowchart illustrating the flow of data collection for emission tomography according to an embodiment.

When gamma rays emitted from the patient body M are incident into an emission detector 4, they are converted by the scintillator block 4a from gamma rays into light. When the converted light is incident into the photoelectron multiplier tube 4b, it is detected as a pulse signal. Any wavelength of light that can be detected by the PMT may be used. That is, an event is produced wherein the gamma rays emitted from the patient body M are detected as pulse signals. In the detector signal processing portion 21, various information of this event is obtained from the pulse signal that is detected. That is, the timing circuit 26 detects the timing information that is the time mark of the detection of the light, and the pulse intensity value that has been converted from analog to digital by the A/D converter 27 is outputted as pulse information (Step S01).

The timing information in this event information is sent to a grouping circuit 22 (Step S02). In the grouping circuit 22, a logical sum of the timing information detected within a given frame, that is, of the timing information that is inputted within a given frame, is taken, to compile timing information for each individual group (Step S03). The group timing information is outputted to the simultaneous count circuit 23.

The simultaneous count circuit 23 identifies, from the plurality of timing information inputted during a single frame, timing information that forms a pair, to detect timing information of a pair of events that is a true simultaneous count (Step S04). Following this, the timing information for a pair of events identified as a true simultaneous count is sent to the memory 28 (Step S05). This simultaneous count information is information that indicates which emission detectors 4 are those that detected the timing information for the pair of events identified as a true simultaneous count. ID information that specifies which emission detectors 4 performed the detections may be added in advance to the timing information that is outputted from the timing circuit 26. This ID information may be, for example, the serial numbers that are assigned to the emission detectors 4.

During the interval over which the processes in Step S02 through S05 are being performed, the pulse information that has been detected is outputted from the A/D converter 27 to the memory 28, where it is stored (Step S11). In the memory 28, the pulse intensity value data is stored while being successively shifted until the identification of the simultaneous counts has been completed. When simultaneous count information indicating the emission detectors 4 that have detected a pair of events identified as a true simultaneous count is inputted from the simultaneous count circuit 23, the respective pulse intensity values stored in the corresponding regions of the memory 28$th$ are sent, as a pair of pulse information, to the location calculating circuit 29 and the energy calculating circuit 30 (Step S06). For example, in FIG. 6, when a signal indicating the emission detectors $4r_i$ and $4r_j$ is inputted into the memory 28 from the simultaneous count circuit 23, the data Da 2 and Da 3 are outputted as pulse information. Pulse intensity information for which there has been no instruction for outputting from the simultaneous count circuit 23 is automatically overwritten, and thus erased, by the data in the next frame.

The location calculating circuit 29 calculates and detects the gamma ray incidence location based on the pulse intensity values of the pair of events inputted from the memory 28 (Step S07). The detected location information is outputted to the energy calculating circuit 30. Moreover, the energy calculating circuit 30 calculates and detects the energy information for the inputted gamma rays based on the pulse intensity values for the pair of events, inputted from the memory 28, and the location information inputted from the location calculating circuit 29 (Step S08). The energy calculating circuit 30 outputs the detected gamma ray energy information and location information as event information to the image reconstructing portion 10 (Step S09).

The image reconstructing portion 10 reconstructs a tomographic image of the patient body M based on the inputted event information. The reconstructed emission tomographic image is displayed on the monitor 12, or stored in the storage device 14, through the main controlling portion 11.

In the data collecting method set forth above, the detected gamma ray location calculation and energy calculation are performed after identifying the simultaneous count by the timing information that was detected. Thus, location calculations and the energy calculations need only be performed for those events identified as true simultaneous counts. As a result, there is no need to perform the location calculations or energy calculations for all of the events that are detected, thereby making it possible to substantially reduce the amount of calculation.

In this way, the data collecting device 9, the PET device 1, and the data collecting method in the present embodiment do not require the provision of location calculating circuits 29 and energy calculating circuits 30 for each of the emission detectors 4. Moreover, the pulse intensity values for events not identified as true simultaneous counts are erased automatically in the memory 28, making it possible to eliminate excessive processing of radiation pulse signals, enabling a reduction in the amount of data processing in the data collecting device 9 and the emission tomography device 1. Moreover, the faster the processing of the location calculations and energy calculations, for example, if operating with a clock of 100 MHz, the more potential there is for the circuit boards through which the high-speed clocks pass to become sources of noise. When a large number of such circuit boards are provided in each of the emission detectors 4, this can become an extremely large source of noise in the data collecting device 9 and the emission tomography device 1. However, in the present embodiment, the number of circuit boards for the location calculating circuit 29 and the energy calculating circuit 30 can be decreased substantially, making it possible to reduce the noise that is produced even when performing the location calculations and energy calculations at high speeds.

The present disclosure is not limited to the embodiment set forth above, but alternate embodiments, such as those set forth below, are also possible.

Figure 8:
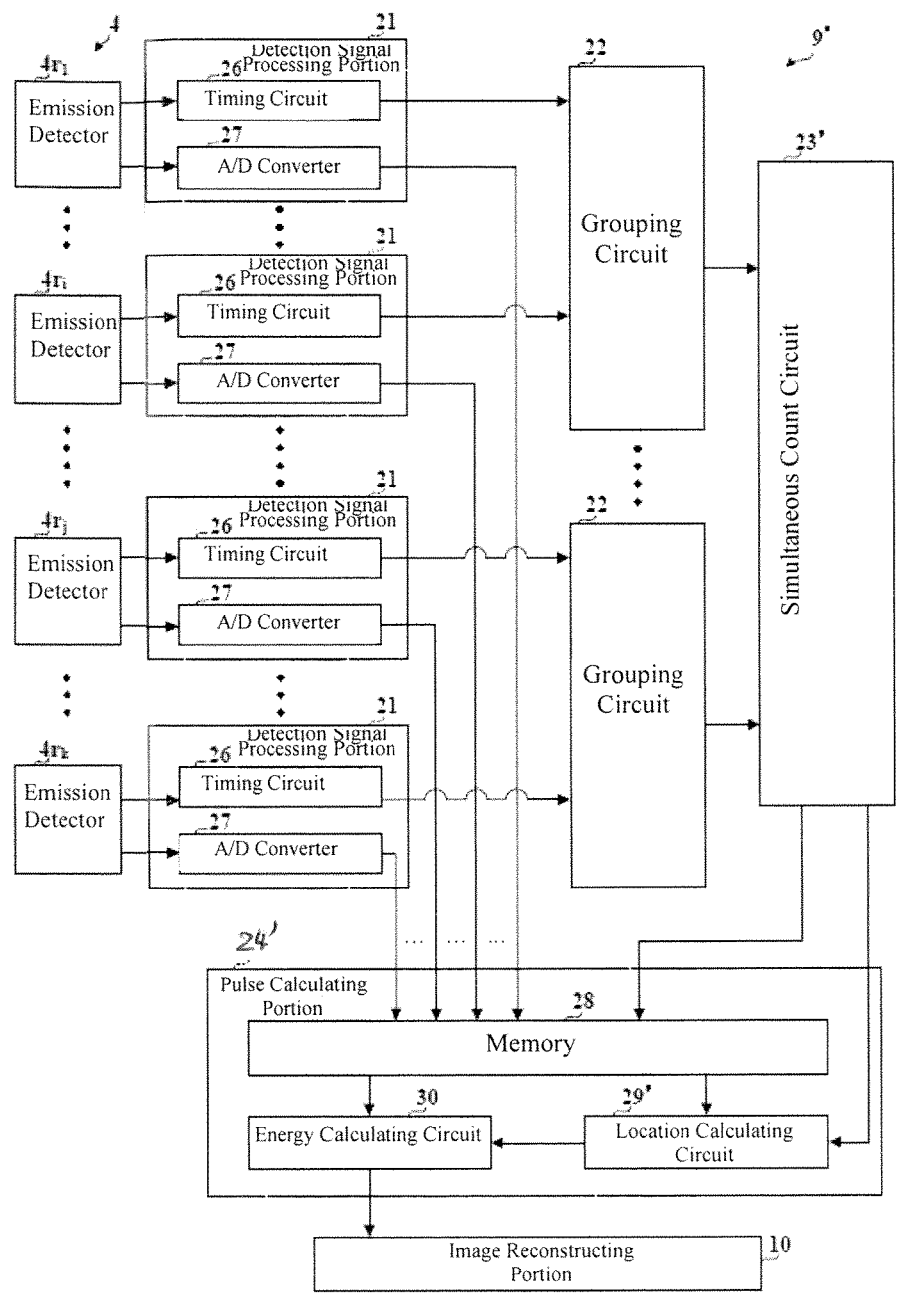
FIG. 8 is a block diagram illustrating a structure for a data collecting device according to an alternate example.
Figure 9:
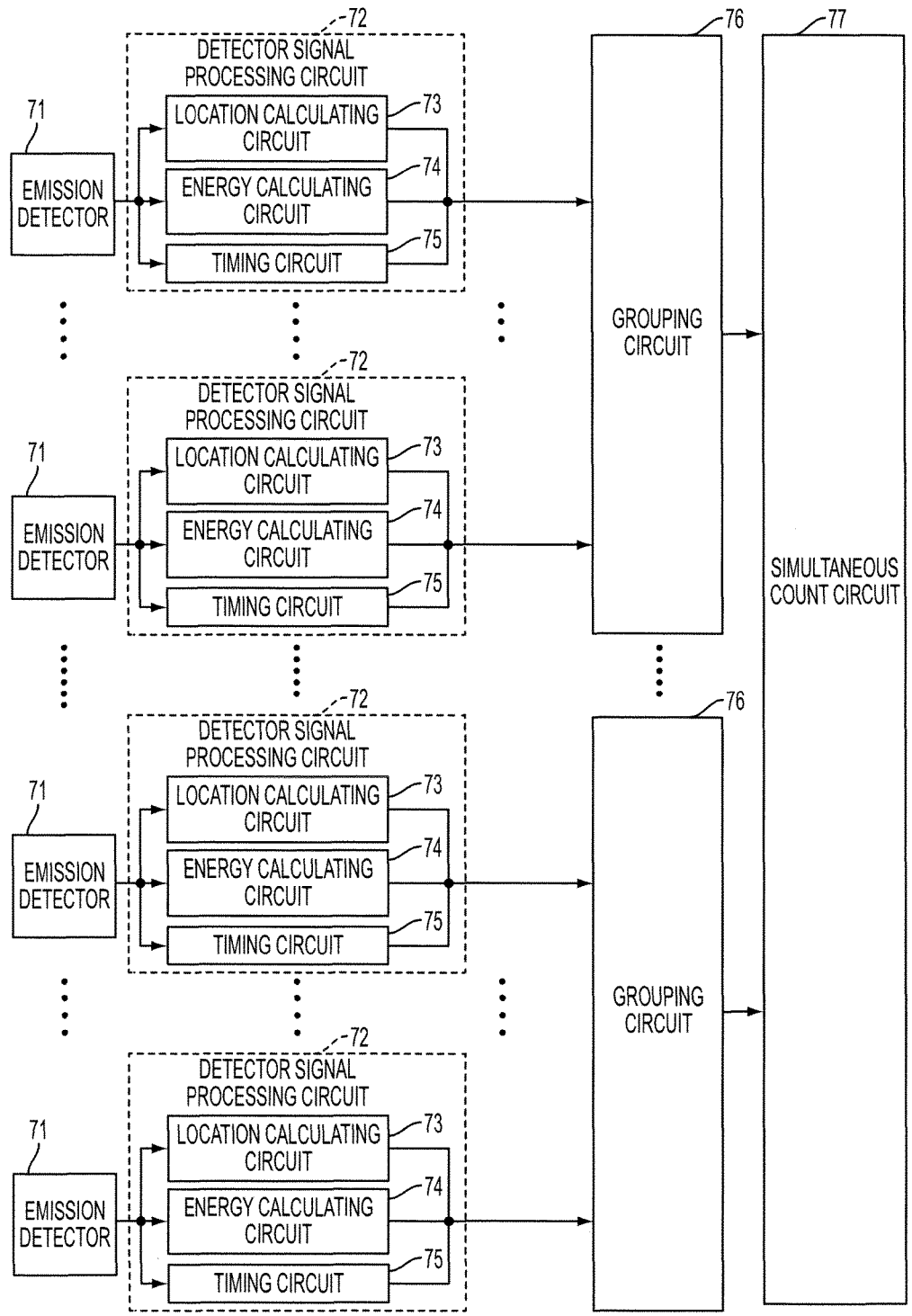
FIG. 9 is a block diagram illustrating a structure of a data collecting device according to a conventional example.

TOF Type (1) While in the embodiment set forth above the explanation was for a PET device that does not use a time difference detected for an annihilation emission pair, there is no limit thereto, and instead it may be a TOF-type PET device. In the case of a TOF-type PET device as illustrated in FIG. 8, the simultaneous count circuit 23' of the data collecting device 9' not only identifies events of true simultaneous counts, but further detects the time difference information for the events detected as true simultaneous counts.

In addition to the simultaneous count information from the simultaneous count circuit 23', the time difference information detected for the annihilation emission pair is also inputted into the location calculating circuit 29'. The location calculating circuit 29' not only calculates the locations of incidence of the gamma rays, but also calculates, from the time difference information, the location of emission of the gamma rays. This makes it possible to perform location calculations with greater accuracy. Note that the data collecting device 9', simultaneous count circuit 23', pulse calculating portion 24' and location calculating circuit 29' are provided, respectively, with the functions of the corresponding data collecting device 9, simultaneous count circuit 23, pulse calculating portion 24 and location calculating circuit 29 in the first embodiment shown in FIG. 4. In this way it is possible to substantially decrease the excessive processing of emission pulse signals, through erasing, without performing location calculations or energy calculations, pulse information for events not identified as simultaneous counts, even in TOF-type PET devices.

Provision of Individual Memory (2) While in the embodiments set forth above the pulse intensity values that were converted into digital signals were stored together in the memory 28, there is no limitation thereto. For example, memory may be provided in each individual detection signal processing portion 21, or memory may be provided for each group for which the timing information is grouped.

No Grouping (3) While in the embodiments set forth above grouping circuits 22 were used to compile, for each group, the timing information outputted from the individual timing circuits 26, to output them to the simultaneous count circuit 23, there is no limitation thereto. For example, the structure may be one wherein each timing circuit 26 outputs directly to the simultaneous count circuit 23.

Alternate Example of a PET Device (4) While in the embodiments set forth above a PET device 1 was used as the emission tomography device, there is no limitation thereto, but rather it may instead be a PET-CT device or a PET-MR device.

Having described embodiments, it is noted that modifications and variations can be made by person skilled in the art in light of the above teachings. It is therefore to be understood that changes may be made in the particular embodiments disclosed that are within the scope and sprit of the disclosure as defined by the appended claims and equivalents.

What is claimed is:

1. An emission tomography device, comprising:
   a plurality of emission detectors, each configured to detect a pulse signal converted from a gamma ray emitted from a subject;
   a plurality of AD convertors, each configured to receive, from the respective emission detector, the detected pulse signal, and convert an intensity value of the detected pulse signal from an analog signal into a digital signal;
   a plurality of timing circuits, each configured to receive, from a respective emission detector, the detected pulse signal, and identify a pulse signal detection time at which the pulse signal is detected by the respective emission detector;
   a simultaneous count circuit configured to receive, from the plurality of timing circuits, a plurality of pulse signal detection times, and determine, as an annihilation emission pair, a pair of pulse signals detected within a time frame of each other based on the received plurality of pulse signal detection times, wherein the simultaneous count circuit determines the pair of pulse signals during which each of the plurality of AD convertors converts the intensity value of the detected pulse signal from the analog signal to the digital signal;
   a pulse calculating portion configured to:
      receive, from the plurality of AD convertors, a plurality of intensity values, and store, in a memory, the plurality of intensity values;
      receive, from the simultaneous count circuit, information including the annihilation emission pair and a pair of pulse signal detection times corresponding to the annihilation emission pair; and
      identify, from the plurality of intensity values, one or more intensity values corresponding to the annihilation emission pair based on the received information, wherein the pulse calculating portion comprises:
      a location calculating circuit configured to calculate a detection location of the gamma ray based on the one or more intensity values corresponding to the annihilation emission pair; and
      an energy calculating circuit configured to receive, from the location calculating circuit, the detection location of the gamma ray, and calculate an energy of the gamma ray based on the one or more intensity values and the received detection location of the gamma ray.

2. The emission tomography device as set forth in claim 1, wherein:
   the pulse calculating portion is further configured to erase, from the memory, one or more intensity values corresponding to the pulse signal detection times not identified as the annihilation emission pair.

3. The emission tomography device as set forth in claim 1, wherein:
   the simultaneous count circuit is further configured to detect timing difference information for the annihilation emission pair; and
   the location calculating circuit is further configured to calculate a gamma ray emission location based on the time difference information inputted from the simultaneous count circuit.

4. The emission tomography device as set forth in claim 1, further comprising:
   a plurality of grouping circuits, each of which corresponds to respective timing circuits and is configured to apply a logical sum of a group of pulse signal detection times corresponding to pulse signals detected within a given frame, and compile timing information for the group of pulse signal detection times.

5. The data collecting device for an emission tomography device as set forth in claim 1, further comprising a plurality of detector signal processing portion, each including a pair of a timing circuit and an AD convertor, each corresponding to one emission detector.

6. An emission tomography device comprising:
   a plurality of emission detectors, each configured to detect, as a pulse signal, a gamma ray incident from a subject; and
   a data collecting device comprising:
      a plurality of timing circuits, each configured to receive, from a respective emission detector, the detected pulse signal, and identify a pulse signal detection time at which the pulse signal is detected by the respective emission detector;
      a simultaneous count circuit configured to receive, from the plurality of timing circuits, a plurality of pulse signal detection times, and determine, as an annihilation emission pair, a pair of pulse signals detected within a time frame of each other based on the received plurality of pulse signal detection times;
      a plurality of AD convertors, each configured to receive, from the respective emission detector, the detected pulse signal, and convert an intensity value of the detected pulse signal from an analog signal into a digital signal, wherein each of the plurality of AD convertors converts the intensity value of the detected pulse signal from the analog signal to the digital signal during which the simultaneous count circuit determines the annihilation emission pair;

a pulse calculating portion configured to:
- receive, from the simultaneous count circuit, information including the annihilation emission pair and a pair of pulse signal detection times corresponding to the annihilation emission pair;
- receive, from the plurality of AD convertors, a plurality of intensity values, and store, in a memory, the plurality of intensity values; and
- identify, from the plurality of intensity values, one or more intensity values corresponding to the identified annihilation emission pair, wherein the pulse calculating portion comprises:
- a location calculating circuit configured to calculate a detection location of the gamma ray based on the one or more intensity values of the pulse signals corresponding to the annihilation emission pair; and
- an energy calculating circuit configured to receive, from the location calculating circuit, the detection location of the gamma ray, and calculate an energy of the gamma ray based on the one or more intensity values and the received detection location of the gamma ray; and an image reconstructing portion configured to reconstruct a tomographic image of the subject based on the detection location of the gamma ray and the energy of the gamma ray.

7. The emission tomography device for an emission tomography device as set forth in claim 6, wherein:
the pulse calculating portion is further configured to erase, from the memory, one or more intensity values corresponding to the pulse signal detection times not identified as the annihilation emission pair.

8. The emission tomography device as set forth in claim 6 or claim 7, wherein:
the simultaneous count circuit is configured to detect timing difference information for the annihilation emission pair; and
the location calculating circuit is configured to calculate a gamma ray emission location based on the time difference information inputted from the simultaneous count circuit.

9. The emission tomography device as set forth in claim 6, further comprising a detector ring which includes the plurality of emission detectors, wherein the plurality of emission detectors are disposed in the shape of a ring in the detector ring.

10. A method for an emission tomography device, the method including:
- detecting, by a plurality of emission detectors, a plurality of pulse signals converted from gamma rays emitted from a subject;
- identifying a plurality of pulse signal detection times at which the plurality of pulse signals is detected by the plurality of emission detectors;
- determining, as an annihilation emission pair, a pair of pulse signals detected within a time frame of each other based on the plurality of pulse signal detection times;
- during which the plurality of pulse signal detection times is identified and the pair of pulse signals is determined, converting intensity values of the detected plurality of pulse signals from an analog signal into a digital signal;
- identifying, from the plurality of intensity values, one or more intensity values corresponding to the annihilation emission pair based on a pair of pulse signal detection times corresponding to the annihilation emission pair;
- calculating a detection location of the gamma ray based on the one or more intensity values corresponding to the annihilation emission pair;
- calculating an energy of the gamma ray based on the one or more intensity values and the detection location of the gamma ray; and
- reconstructing a tomographic image of the subject based on the energy of the gamma ray and the detection location of the gamma ray.

11. The method as set forth in claim 10, determining the pair of pulse signals further comprising applying a logical sum of a group of pulse signal detection times corresponding to pulse signals detected within a given time frame, and compiling timing for the group of pulse signal detection times.

12. The method as set forth in claim 10, further comprising storing, in a memory, the plurality of intensity values and the pair of pulse signal detection times corresponding to the annihilation emission pair.

13. The method as set forth in claim 10, further comprising displaying the tomographic image on a display.

* * * * *